Dec. 18, 1962 F. W. BROOKS 3,068,842
BRAKE BOOSTER UNIT
Filed Nov. 28, 1960 2 Sheets-Sheet 1

INVENTOR.
Frank W. Brooks
BY
HIS ATTORNEY

INVENTOR.
Frank W. Brooks
BY
HIS ATTORNEY

United States Patent Office 3,068,842
Patented Dec. 18, 1962

---

3,068,842
BRAKE BOOSTER UNIT
Frank W. Brooks, Dayton, Ohio, assignor to General Motors Corporation, Detroit, Mich., a corporation of Delaware
Filed Nov. 28, 1960, Ser. No. 71,983
14 Claims. (Cl. 121—41)

This invention relates to a brake booster unit and more particularly to a valve means operating in combination with the booster unit.

The conventional booster unit operates on the principle of creating a differential of air pressures on a pressure responsive wall to drive a force transmitting member. The differential of pressures on the power wall is created by means of a valve mechanism controlled by a manually operated means. This valve control mechanism in a vacuum type of booster unit permits the flow of air pressure or the evacuation of a chamber in response to the movement of the valve mechanism. Considerable effort has been devoted towards simplifying the valve structure on a booster unit and still maintaining reliability to prevent failures of the unit.

Accordingly, this invention is intended to provide a valve means which is simple in its operation and yet reliable in performing the function necessary to control the operation of the booster unit. The device employs a valve structure in which a single element operates as the high pressure and low pressure valve seats and also performs a sealing means for the high and low pressures of the incoming expansible fluid.

It is an object of this invention to provide a single element operating within a booster unit to form the valve seats for the vacuum and the air valve.

It is a further object of this invention to employ a single element operating concentrically with the high and low pressure valve elements to provide a sealing means for the differential pressures in the chambers of the valve mechanism.

It is a further object of this invention to provide a single valve seat member for engagement with the low and the high pressure valve elements and also employ the pressure of the high pressure fluid in the valve means to bias the member to contact the high and the low pressure valve elements.

It is a further object of this invention to employ a rubber O-ring operating as a self-sealing member between the high and the low pressure fluids in a valve mechanism and also forming the valve seat for the high and the low pressure valve elements in a booster unit.

The objects of this invention are accomplished by providing a booster unit having a manual control means operating the valve means in the booster unit. The air valve is operated by manual means and is formed with an annular recess about its outer periphery adjacent to the valve portion formed on the air valve element. The air valve element also is provided with the air valve portion which engages an O-ring positioned within the annular recess of the outer periphery of the air valve element. The air valve element moves axially permitting relative movement of the O-ring within the annular recess on the air valve element. A biasing force is created against the O-ring seal due to the differential pressures operating on opposing surfaces of the O-ring. This biasing force due to the differential pressure causes the O-ring to seat on either the vacuum valve element or the air valve element when the unit is in operation. The O-ring shifts in its relative position in the annular recess of the air valve element to control the flow of vacuum or air pressure to the modulated air chamber which is in communication with a variable pressure compartment in the booster unit. The changing of the air pressure in the variable pressure compartment of the booster unit causes the forward movement of the power wall and the actuation of the vehicle brakes.

Further objects and advantages of the present invention will be apparent from the following description, reference being had to the accompanying drawings, wherein a preferred embodiment of the present invention is clearly shown.

Figure 1:
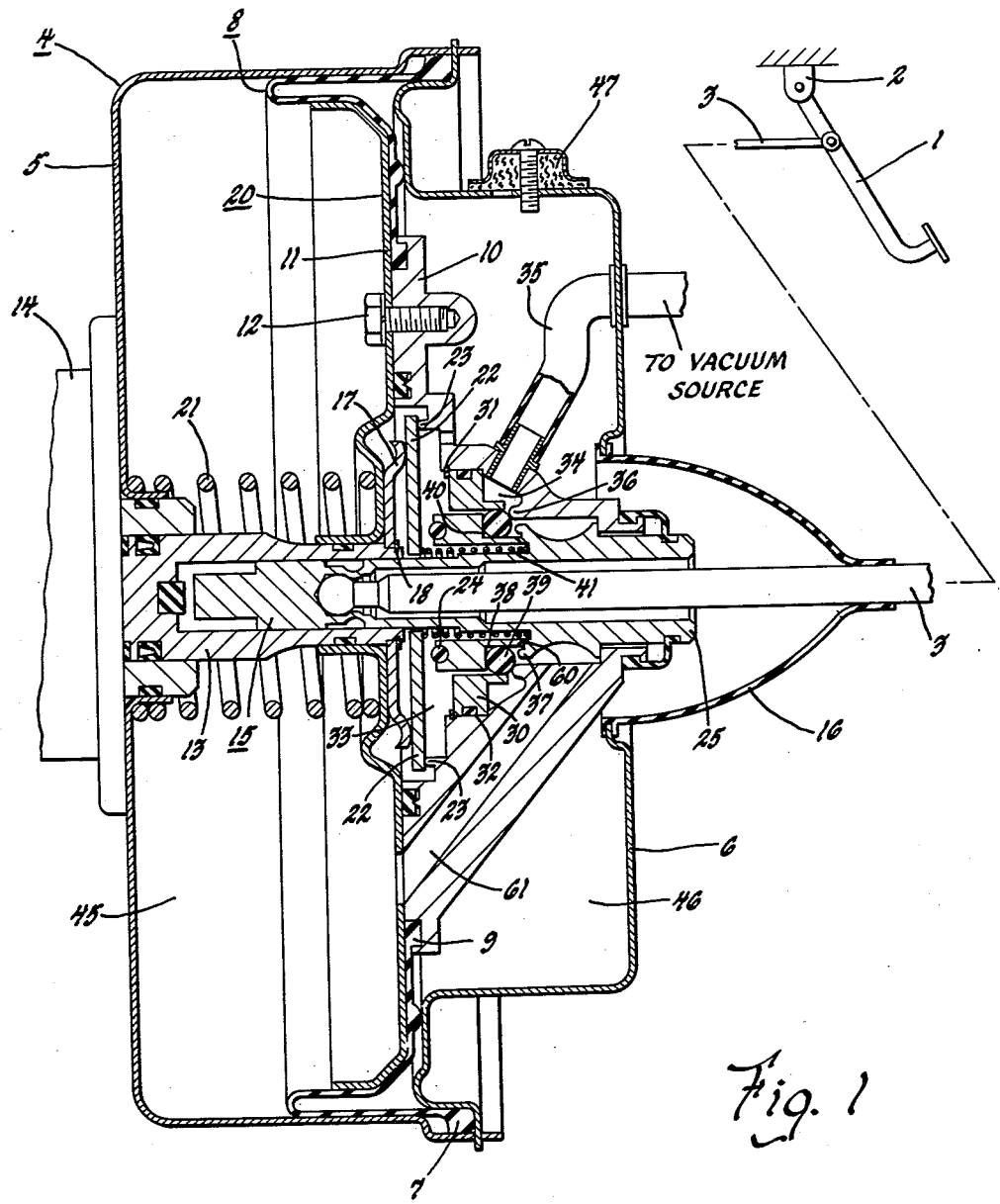
FIGURE 1 is a cross-section view of the valve mechanism and its relative position within the booster unit.

Referring to FIGURE 1, the brake pedal 1 is pivotally mounted on the chassis 2 and pivotally connected to the push rod 3. The push rod 3 extends concentrically within the booster unit 4. The booster unit 4 is formed with a forward housing section 5 and a rearward housing section 6 which are assembled to form a seal on the peripheral bead 7 of the diaphragm 8. The inner periphery of the diaphragm 8 forms an inner peripheral bead 9 which is sealed between the valve housing 10 and the diaphragm support 11. The valve housing 10 and the diaphragm support 11 are fastened by means of a plurality of bolts 12.

The booster unit 4 operates a master piston 13 which extends concentrically within a master cylinder 14. The remaining portions of the master cylinder and master piston are not shown as they are not believed to be a part of this invention. The rearward end of the master piston 13 has a central opening for reception of the air valve member 15. The air valve member 15 also has a central opening extending forwardly from the rearward end to receive the push rod 3. The push rod 3 is sealed on its outer periphery by the boot 16 which extends to the inner periphery of the rearward portion of the housing section 6.

The master piston 13 is received within a reaction plate 17 which is retained in this position by the snap ring 18. The diaphragm support 11 also receives the rearward end of the master piston 13. The power wall 20 is biased to a rearward position by the spring 21.

A reaction means is provided within the power unit 20. The reaction means includes reaction disk 17 operating against a plurality of fingers 22 which are pivotally mounted on the fulcrums 23. The radial inner ends of the fingers 22 engage the annular ring 24 for transmitting a reaction force to the air valve element 25.

The valve housing 10 also encloses the valve mechanism. An adapter ring 30 is retained within an inner periphery of the valve housing by a retainer ring 31. A seal 32 is received within an annular recess on the outer periphery of the adapter ring 30 and forms a seal between the air chamber 33 and the vacuum chamber 34. The vacuum chamber 34 is connected to a source of vacuum through the conduit means 35.

The housing 10 also forms a vacuum valve element 36 which is an annular ridge formed on its inner periphery for engaging the vacuum valve seat. The air valve element 25 also has an annular ridge 37 formed on a radial wall on its intermediate portion to form the air valve element. The air valve element 25 and the vacuum valve element 36 are concentric with each other and the air valve element moves axially relative to the vacuum valve element.

The air valve element 25 is formed with an annular recess 38 which receives the O-ring 39. The O-ring 39 moves axially within a groove 38 contacting the radial wall 40 when the valve means is in its retracted position. The O-ring 39 contacts the valve portion 37 on the opposing radial wall of the annular groove 38 in the operating position. The O-ring is biased to a rearward position in response to the air pressure in the air chamber 33 and the vacuum in the vacuum chamber 34.

The air valve member 25 is biased to a rearward position by the spring 41. The spring 41 is compressively mounted between the air valve member 25 and the plurality of fingers 22. The O-ring 39, as shown, is made of a rubber material. The material of the O-ring 39 may be of rubber or any resilient material forming a valve seat for the vacuum valve element 36 and the air valve portion 37. The O-ring could also be constructed of a metal material or a metal having a coating of a softer material to provide a seating portion for the valve elements.

Figure 2:
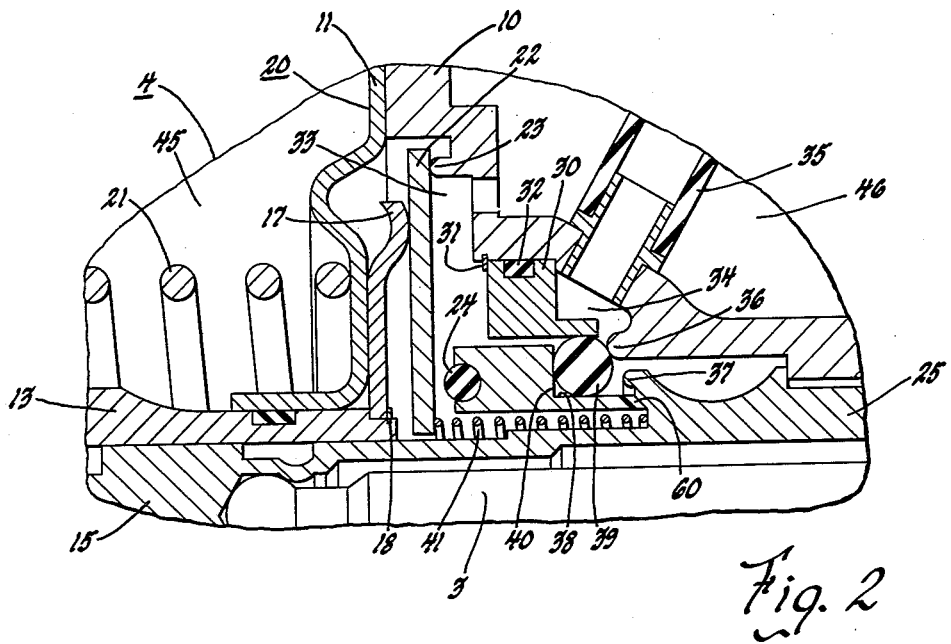
FIGURE 2 is an enlarged cross-section view of the valve means in retracted position.
Figure 3:
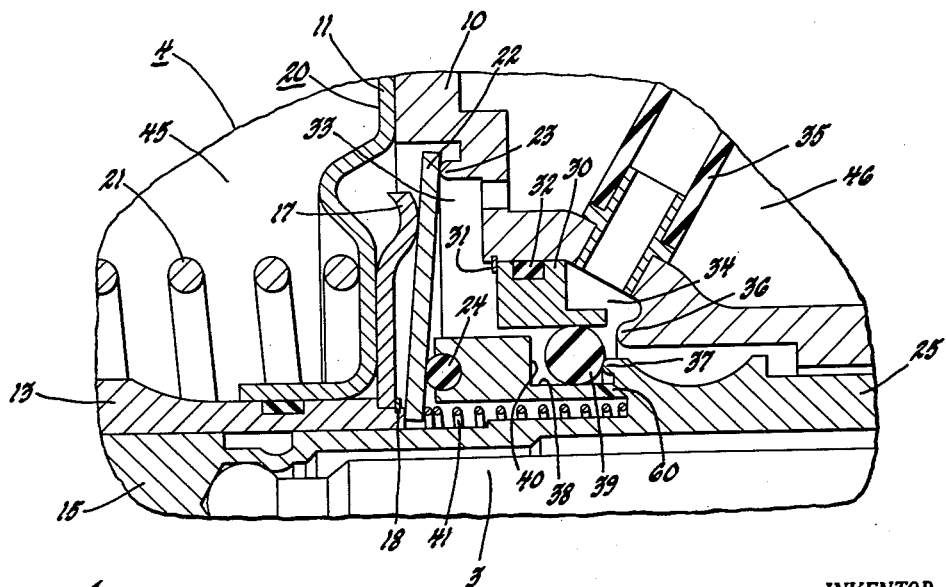
FIGURE 3 is an enlarged cross-section view of the valve means opened to permit operation of the booster unit.

FIGURE 3 is a view similar to that of FIGURE 2 except that FIGURE 3 discloses the device in an operating position whereby the vacuum chamber 34 is in communication with the variable pressure chamber 45 on the forward side of the power wall 20.

The constant pressure chamber 46 is at the same pressure as the ambient air. The constant pressure chamber 46 is in communication with the atmosphere through the filter 47.

The operation of the device illustrated will be described in the following paragraphs. As the brake pedal 1 is depressed, the push rod 3 moves forwardly within the booster unit 4. Initially, the constant pressure compartment 46 and the variable pressure compartment 45 contain air at atmospheric pressure. The power wall is biased to a rearward position by the spring 21 and the air valve element is biased to a rearward position in spaced relation to the O-ring 39 by means of the spring 41. The forward movement of the push rod 3 carries the valve portion 37 on the air valve element 25 in contact with the O-ring 39. In this position, a static condition exists in both of the compartments 45 and 46 of the booster unit. Continued forward movement of the air valve member 25 unseats the vacuum valve element 36 from the O-ring 39. This causes an evacuation of the variable pressure chamber 45 on the forward side of the power wall 20. The evacuation is effected through the valve means whereby the air valve is closed and the vacuum valve is opened permitting the exhaust of air through the vacuum chamber 34 and the passage means 35. A continued open position of the vacuum valve continues to evacuate the chamber 45, thereby causing the forward movement of the power wall and power operation for actuating the vehicle brakes. This condition exists so long as the vacuum valve is open and increased braking effort is achieved due to the continued evacuation of the variable pressure chamber 45.

Simultaneously with the forward movement of the power wall 20, a reaction force is transmitted through the power master piston 13. The reaction force is transmitted to the reaction plate 17 and the plurality of fingers 22. The plurality of fingers engaging the rubber ring 24 transmits the force to the air valve member 25 which is felt on the brake pedal by the operator of the vehicle brakes. The reaction force is proportioned through the mechanical reaction mechanism to transmit a "feel" to the operator of the motor vehicle.

As the vehicle brakes are released, the brake pedal moves rearwardly due to the biasing force of the spring 21 which also moves the power wall rearwardly into its retracted position. Simultaneously with the rearward movement of the power wall, the air valve member 25 is also moved rearwardly in response to the air valve spring 41. In the position where the vacuum valve element 36 is seated on the O-ring and the valve portion 37 of the air valve element 25 is still seated on the O-ring, the booster unit is in the "hold" position. This position maintains a static condition of the fluid pressure within the booster unit and maintains the same braking effort on the vehicle brakes.

Complete release of the brake pedal 1 permits the air valve element 25 to move rearwardly in spaced relation to the O-ring. This permits the air to flow back into the variable pressure chamber 45 on the forward side of the power wall 20. The air passes from the air chamber 33 through the passage 60 about the outer periphery of the air valve through the passage 61 to the forward side of the power wall. In this position, the booster is again in its retracted position. The radial wall 40 of the annular recess 38 biases the O-ring to a contacting position with the vacuum valve element 36. The differential pressure of the air in the air chamber 33 and the vacuum in the vacuum chamber 34 also biases the O-ring to a contacting position on the vacuum valve element 36.

While the embodiment of the invention as herein disclosed constitutes a preferred form, it is to be understood that other forms might be adopted.

What is claimed is as follows:

1. In a vehicle brake booster unit comprising in combination, a housing means, a pressure responsive member in said housing means forming a variable pressure compartment and a constant pressure compartment, valve means, manual means controlling said valve means, a source of low pressure fluid in the form of passage means in communication with said valve means, a source of high pressure fluid in the form of passage means in communication with said valve means, said valve means including, a low pressure valve element, a high pressure valve element and an O-ring valve seat member, said valve seat member being concentrically mounted on the outer periphery of said high pressure valve element and axially movable thereon engageable with said high pressure valve element and said low pressure valve element selectively or concurrently in response to control by said manual means for controlling the pressure on said pressure responsive member when said manual means is actuated.

2. In a brake booster unit comprising in combination, a housing means, a pressure responsive member in said housing means forming a variable pressure compartment and a constant pressure compartment, valve means in said booster unit in communication with said compartments, a source of low pressure fluid in communication with said valve means, a source of high pressure fluid in communication with said valve means, manual means extending into said booster unit engaging said valve means for controlling the operation of said valve means, said valve means located within said pressure responsive member including a high pressure valve element engaging said manual means, a low pressure valve element in said pressure responsive member, a valve seat member mounted in an annular recess on said high pressure valve element, said valve seat member biased by fluid pressure from at least one of said sources of pressure fluid to a contacting position with said valve elements selectively or concurrently during movement of said high pressure valve element by said manual means for operation of said booster unit.

3. In a brake booster unit comprising in combination, a housing means, a pressure responsive member forming a variable pressure compartment and a constant pressure compartment in said housing means, a valve means in said pressure responsive member in communication with said variable pressure compartment and said constant pressure compartment, a source of low pressure fluid in communication with said valve means, a source of high pressure fluid in communication with said valve means, a low pressure valve element formed integral with said pressure responsive member, a high pressure valve element engaging manual operating means concentrically located relative to said low pressure valve element, a single valve seat member mounted in an annular recess on said high pressure valve element, said valve seat member biased to a contacting position with said valve elements selectively or concurrently in response to a differential pressure of fluid on opposing sides of said valve element, said high pressure valve element shifting the axial position of said valve element relative to said low pressure valve element in response to actuation of said booster unit by said manual means.

4. In a brake booster unit comprising in combination, a housing means, a pressure responsive member in said housing means separating the interior portion of said housing into a variable pressure compartment and a constant pressure compartment, a valve means in said pressure responsive member, a source of vacuum in controlled communication through said valve means with said variable pressure compartment in said housing means, a source of high pressure fluid in communication with said valve means and said constant pressure compartment, manual means connected to said valve means for controlling the operation of said booster unit, said valve means including a vacuum valve element formed integral with said pressure responsive member, an air valve element slidably mounted concentrically within said pressure responsive member, an annular recess formed about the outer periphery of said air valve element, an O-ring positioned within said annular recess forming a valve seat member for said vacuum valve element and said air valve element, said valve seat member biased to a contacting position with said air valve element and said vacuum element in response to a differential pressure of fluid on opposing sides of said valve seat member, said manual means controlling the operation of said valve means to operate said booster unit by controlling the air pressure to said variable pressure compartment.

5. In a brake booster unit comprising in combination, a housing means, a pressure responsive member in said housing means forming a variable pressure compartment and a constant pressure compartment, a valve means in said pressure responsive member in communication with said variable pressure compartment and said constant pressure compartment in said housing means, manual means engaging said valve means for controlling the operation of said valve means, a source of vacuum in communication with said valve means, a source of air pressure in communication with said valve means and constant pressure compartment, said valve means including a vacuum valve mounted within said pressure responsive member, a sliding air valve concentrically located relative to said vacuum valve and mounted within said pressure responsive member, an annular recess formed on the outer periphery of said air valve, an O-ring received within said annular recess on said air valve, said vacuum valve and said air valve selectively or concurrently engaging said O-ring in response to movement by said manual means for operation of said valve means.

6. In a brake booster unit comprising in combination, a housing means, a pressure responsive member forming a variable pressure compartment and a constant pressure compartment in said booster unit, a valve means in said pressure responsive member, said valve means in communication with said variable pressure compartment and said constant pressure compartment, a source of vacuum in communication with said valve means, manual means connected to said valve means for controlling the operation of said valve means and said booster unit, said valve means including a vacuum valve mounted in said pressure responsive member, a sliding air valve mounted concentrically with said vacuum valve, an annular recess formed on the outer periphery of said sliding air valve, a rubber O-ring received within said annular recess of said sliding air valve, said O-ring biased to a contacting position with said valve elements in response to a differential of pressure operating on opposing sides of said O-ring, said manual means shifting the axial position of said O-ring relative to said pressure responsive member for operating of said valve means for controlling the operation of said booster unit.

7. In a brake booster unit comprising in combination, a housing means, a pressure responsive member in said housing means separating the interior portion of said booster unit into a variable pressure compartment and a constant pressure compartment, a force transmitting member connected to said pressure responsive member, a valve means in said pressure responsive member in communication with said variable pressure compartment and said constant pressure compartment, manual means connected to said valve means for controlling the operation of said valve means, a source of vacuum in communication with said valve means, a reaction means for transmitting a reaction force from said force transmitting member through said reaction means, a slidably air valve connected to said manual control means extending to a point adjacent to said reaction means, a rubber cushion ring engaging said reaction means to reduce impact upon actuation of said reaction means, said valve means including said sliding air valve concentrically mounted within said pressure responsive member, a vacuum valve concentrically mounted relative to said air valve in said pressure responsive member, an annular ring engaging said air valve and said vacuum valve, means formed on said air valve for reception of said annular ring, said manual means shifting the relative axial position of said annular ring for selective engagement of said air valve and said vacuum valve to provide the operation of said booster unit.

8. In a brake booster unit comprising in combination, a housing means, a power wall within said housing means dividing said booster unit in a variable pressure compartment and a constant pressure compartment, a force transmitting member connected to said power wall, a valve means mounted in said power wall, a source of vacuum in communication with said valve means, manual means connected to said valve means for operating said booster unit, said valve means including a vacuum valve mounted within said power wall, a sliding air valve slidably mounted in said power wall concentrically located relative to said vacuum valve, an annular recess formed in said sliding air valve, an annular ring positioned within said annular recess of said sliding air valve, an adapter member engaging a portion of said annular ring to provide a sealing means between a vacuum chamber and an air chamber in said power wall, said annular ring biased to a contacting position with said vacuum valve and said air valve in response to the differential of air pressure and vacuum pressure in said valve means, said manual means shifting the axial position of said annular ring relative to said vacuum valve, thereby selectively controlling the flow of vacuum and the flow of air pressure in said variable pressure compartment for controlling the operation of said booster unit.

9. In a brake booster unit comprising in combination, a housing means, a power wall in said housing means extending through the intermediate portion of said booster unit to form a constant pressure compartment and a variable pressure compartment, a force transmitting member connected to said power wall, a valve means mounted within said power wall, a source of vacuum in communication with said valve means for controlling the operation of said valve means and said booster unit, said valve means including a vacuum valve in said power wall, a sliding air valve connected to said manual means concentrically located within said power wall and said vacuum valve, an annular recess formed in said sliding air valve, a rubber O-ring received within said annular recess, an adapter ring mounted concentrically within said power wall and engaging a portion of said O-ring, said O-ring forming a seal between a vacuum chamber and an air chamber in said power wall, the differential pressures of said chambers biasing said O-ring to a contacting position with said valves selectively or concurrently, said sliding air valve moving axially in response to said manual means selectively shifting said O-ring axially relative to said vacuum valve and said air valve to selectively control the flow of vacuum and air pressure in said variable pressure compartment in said booster unit in response to operation of said manual means.

10. In a brake booster unit comprising in combination, a housing means, a power wall extending through the intermediate portion of said housing means to form a variable pressure compartment and a constant pressure compartment, a force transmitting member connected to said power wall, a valve means positioned in said power wall, manual operating means connected to said valve means, a source of vacuum connected to said valve means, said valve means including a vacuum valve formed integral with said power wall, a sliding air valve mounted concentrically within said vacuum valve connected to said manual control means, an annular recess formed on the outer periphery of said air valve, an annular ridge formed on a radial wall of said annular recess to form a valve portion of said air valve, an adapter ring mounted concentrically around said sliding air valve on the inner periphery of said power wall, a resilient O-ring positioned between said adapter ring and said annular recess of said sliding air valve forming a seal between a vacuum chamber and an air chamber in said power wall, said resilient ring biased to a contacting position with said vacuum valve and said air valve, said annular recess in said sliding air valve having a larger axial dimension than said resilient ring, said sliding air valve shifting the axial position of said O-ring relative to said vacuum valve and said air valve for selectively contacting said vacuum valve and said air valve in response to axial movement by said manual means for controlling the operation of said booster unit.

11. In a brake booster unit comprising in combination, a housing means, a pressure responsive member in said housing means dividing the interior portion of said housing means into a variable pressure compartment and a constant pressure compartment, a valve means in said pressure responsive member, manual means connected to said valve means for controlling movement of said valve means, a source of vacuum in communication with said valve means, said valve means including a vacuum valve formed integral with said pressure responsive member, a sliding air valve slidably mounted within said vacuum valve and said pressure responsive member, an annular recess on the outer periphery of said air valve, a rubber O-ring positioned within said annular recess biased to a contacting position with said valves selectively or concurrently by differential pressures in said valve means, said manual means shifting said O-ring relative to said vacuum valve and said air valve to selectively control the flow of vacuum and air pressure to said variable pressure compartment for operation of said booster unit.

12. In a brake booster unit comprising in combination, a housing means, a pressure differential responsive member in said housing means and forming therewith a variable pressure compartment and a constant pressure compartment, valve means regulating pressure in said variable pressure compartment, means for actuating said valve means, passage means in communication with said valve means providing a source of low pressure fluid, other passage means communicating with said valve means providing a source of high pressure fluid, said valve means including a low pressure valve element and a high pressure valve element in concentric relationship and having relative axial movement therebetween, and a single valve seat member mounted on one of said valve elements concentrically relative to said valve elements and axially movable relative to the valve element on which it is mounted and relative to said valve elements and selectively or concurrently engageable therewith in response to movement by said valve actuating means to control thereby pressure differential on said pressure differential responsive member when said valve actuating means is operated.

13. A brake booster unit comprising the structure as set forth in claim 12 wherein the said single valve seat member comprises an "O" ring.

14. Valve means controlling fluid flow relative to a chamber, comprising, first and second valve elements in concentric relationship and having relative axial movement therebetween, passage means in communication with said first valve element providing a source of pressure fluid, second passage means communicating with said second valve element providing a source of pressure fluid different from that of said first source, a single valve seat member carried on one of said valve elements concentrically relative to said valve elements and axially movable relative to the valve element on which it is carried and relative to both said valve elements and selectively or concurrently engageable therewith on axial movement of the seat member to control fluid flow through the aforesaid passage means, and third passage means in communication with both said valve elements providing controlled fluid flow relative to a variable pressure chamber connected therewith on selective engagement of said seat member with said valve elements by axial movement of said one valve element.

References Cited in the file of this patent
UNITED STATES PATENTS

| | | |
|---|---|---|
| 2,743,707 | Kellerman | May 1, 1956 |
| 2,826,042 | Rike et al. | Mar. 11, 1958 |
| 2,914,035 | Banker | Nov. 24, 1959 |
| 2,969,046 | Kellogg et al. | Jan. 24, 1961 |